(12) United States Patent
Firik et al.

(10) Patent No.: US 11,205,421 B2
(45) Date of Patent: Dec. 21, 2021

(54) SELECTION SYSTEM AND METHOD

(71) Applicant: Cerence Operating Company, Burlington, MA (US)

(72) Inventors: Mustafa Turker Firik, Watertown, MA (US); Nils Lenke, Rheinbach (DE); Reimund Emil Schmald, Aachen (DE)

(73) Assignee: Cerence Operating Company, Burlington, MA (US)

(*) Notice: Subject to any disclaimer, the term of this patent is extended or adjusted under 35 U.S.C. 154(b) by 0 days.

(21) Appl. No.: 15/663,280

(22) Filed: Jul. 28, 2017

(65) Prior Publication Data

US 2019/0311712 A1 Oct. 10, 2019

(51) Int. Cl.
| | |
|---|---|
| *G10L 15/22* | (2006.01) |
| *G10L 13/027* | (2013.01) |
| *G06F 3/16* | (2006.01) |
| *G10L 13/00* | (2006.01) |
| *G10L 13/04* | (2013.01) |

(52) U.S. Cl.
CPC .............. *G10L 15/22* (2013.01); *G06F 3/167* (2013.01); *G10L 13/00* (2013.01); *G10L 13/027* (2013.01); *G10L 13/04* (2013.01); *G10L 2015/223* (2013.01)

(58) Field of Classification Search
CPC ... G10L 15/22; G10L 2015/223; G10L 15/30; G10L 2015/228; G10L 15/28; G10L 17/22; G10L 2015/088; G10L 15/08; G10L 15/32; G10L 21/02; G10L 25/60; G10L 15/00; G10L 15/02; G10L 15/065; G10L 17/02; G10L 17/14; G10L 2021/02166; G10L 21/00; G10L 21/10; G10L 25/78; G10L 25/84; G10L 13/00; G10L 13/04; G10L 13/027; G06F 3/167; G06F 17/27; G06F 17/271
See application file for complete search history.

(56) References Cited

U.S. PATENT DOCUMENTS

| | | | | |
|---|---|---|---|---|
| 9,401,140 B1* | 7/2016 | Weber | ...................... | G10L 15/00 |
| 9,984,686 B1* | 5/2018 | Mutagi | ................... | G10L 15/22 |
| 10,235,129 B1* | 3/2019 | Carlson | .................. | G06F 3/167 |
| 10,255,917 B2* | 4/2019 | Carey | ....................... | G10L 15/22 |
| 2004/0192384 A1* | 9/2004 | Anastasakos | ........... | G10L 15/30 |
| | | | | 455/557 |
| 2006/0018440 A1* | 1/2006 | Watkins | ................... | G10L 15/22 |
| | | | | 379/88.01 |
| 2009/0190735 A1* | 7/2009 | Gilmartin | ........... | B60R 16/0373 |
| | | | | 379/201.12 |

(Continued)

OTHER PUBLICATIONS

International Search Report and Written Opinion of counterpart International Application Serial No. PCT/US2018/043664 dated Aug. 30, 2018.

*Primary Examiner* — Abdelali Serrou
(74) *Attorney, Agent, or Firm* — Occhiuti & Rohlicek LLP

(57) ABSTRACT

A method, computer program product, and computing system for receiving a verbal command, from a user, on a vehicle infotainment system, wherein the vehicle infotainment system is configured to interface with an external system. A preferred system is identified for executing the verbal command. The verbal command is routed to the preferred system, wherein the preferred system is selected from the vehicle infotainment system and the external system.

16 Claims, 2 Drawing Sheets

(56) References Cited

U.S. PATENT DOCUMENTS

| | | | |
|---|---|---|---|
| 2009/0204409 A1* | 8/2009 | Mozer | G10L 15/32 |
| | | | 704/275 |
| 2013/0080931 A1* | 3/2013 | Sirpal | G06F 3/167 |
| | | | 715/761 |
| 2014/0172953 A1* | 6/2014 | Blanksteen | H04L 67/22 |
| | | | 709/203 |
| 2014/0249821 A1* | 9/2014 | Kennewick | G10L 15/22 |
| | | | 704/257 |
| 2015/0006184 A1 | 1/2015 | Marti et al. | |
| 2015/0088518 A1* | 3/2015 | Kim | G10L 15/22 |
| | | | 704/251 |
| 2015/0172450 A1* | 6/2015 | Singhal | H04M 1/72577 |
| | | | 455/419 |
| 2016/0005404 A1* | 1/2016 | Yokoya | H04N 21/233 |
| | | | 704/275 |
| 2016/0078870 A1* | 3/2016 | Helm | G10L 17/22 |
| | | | 704/275 |
| 2016/0155443 A1* | 6/2016 | Khan | G06F 1/3203 |
| | | | 704/275 |
| 2016/0297543 A1* | 10/2016 | Li | B64D 45/00 |
| 2017/0025124 A1* | 1/2017 | Mixter | G10L 15/32 |
| 2017/0076720 A1* | 3/2017 | Gopalan | G10L 15/22 |
| 2017/0249953 A1* | 8/2017 | Yassa | G10L 21/013 |
| 2017/0334500 A1* | 11/2017 | Jarek | B62J 99/00 |
| 2017/0345422 A1* | 11/2017 | Yang | G06F 3/167 |
| 2018/0088902 A1* | 3/2018 | Mese | G10L 15/22 |
| 2019/0355365 A1* | 11/2019 | Kim | G10L 17/12 |

* cited by examiner

SELECTION SYSTEM AND METHOD

TECHNICAL FIELD

This disclosure relates to selection systems and, more particularly, to selection systems for use within vehicle-based infotainment systems.

BACKGROUND

Today's automobiles are highly computerized. Additionally, surveys have shown that new car buyers are very interested in car electronics that allow for continued connectivity while on the road. Accordingly, car manufactures now offer highly-advanced, voice-controlled infotainment systems within their vehicles that provide the user with many different types of functionality. One specific functionality that these infotainment systems offer is the ability to interface with external systems (such as smart phones and tablet computers).

Unfortunately, the voice interface for these infotainment systems is often underwhelming, as selecting between the functionality offered by the external system and the functionality offered by the infotainment system often proves difficult.

SUMMARY OF DISCLOSURE

In one implementation, a computer-implemented method is executed on a computing device and includes receiving a verbal command, from a user, on a vehicle infotainment system, wherein the vehicle infotainment system is configured to interface with an external system. A preferred system is identified for executing the verbal command. The verbal command is routed to the preferred system, wherein the preferred system is selected from the vehicle infotainment system and the external system.

One or more of the following features may be included. The external system may include one or more of: a cellular telephone; a smart phone; a tablet computing device; a portable computing device; and a handheld entertainment device. Identifying a preferred system for executing the verbal command may include identifying the preferred system based, at least in part, upon one or more of a defined system preference associated with the verbal command and a learned system preference associated with the verbal command. Identifying a preferred system for executing the verbal command may include identifying the preferred system based, at least in part, upon an embedded system preference included within the verbal command. Identifying a preferred system for executing the verbal command may include identifying the preferred system based, at least in part, upon the existence of an active session with one of the vehicle infotainment system and the external system. Identifying a preferred system for executing the verbal command may include: providing a verbal inquiry to the user; and identifying the preferred system based, at least in part, upon a verbal response received from the user concerning the verbal inquiry provided to the user. Identifying a preferred system for executing the verbal command may include: providing the verbal command to both the vehicle infotainment system and the external system; and determining the preferred system based, at least in part, upon a response received from one or more of the vehicle infotainment system and the external system. The gender of the text-to-speech voice of the external system may be determined. The gender of the text-to-speech voice of the vehicle infotainment system may be set based upon the gender of the text-to-speech voice of the external system.

In another implementation, a computer program product resides on a computer readable medium and has a plurality of instructions stored on it. When executed by a processor, the instructions cause the processor to perform operations including receiving a verbal command, from a user, on a vehicle infotainment system, wherein the vehicle infotainment system is configured to interface with an external system. A preferred system is identified for executing the verbal command. The verbal command is routed to the preferred system, wherein the preferred system is selected from the vehicle infotainment system and the external system.

One or more of the following features may be included. The external system may include one or more of: a cellular telephone; a smart phone; a tablet computing device; a portable computing device; and a handheld entertainment device. Identifying a preferred system for executing the verbal command may include identifying the preferred system based, at least in part, upon one or more of a defined system preference associated with the verbal command and a learned system preference associated with the verbal command. Identifying a preferred system for executing the verbal command may include identifying the preferred system based, at least in part, upon an embedded system preference included within the verbal command. Identifying a preferred system for executing the verbal command may include identifying the preferred system based, at least in part, upon the existence of an active session with one of the vehicle infotainment system and the external system. Identifying a preferred system for executing the verbal command may include: providing a verbal inquiry to the user; and identifying the preferred system based, at least in part, upon a verbal response received from the user concerning the verbal inquiry provided to the user. Identifying a preferred system for executing the verbal command may include: providing the verbal command to both the vehicle infotainment system and the external system; and determining the preferred system based, at least in part, upon a response received from one or more of the vehicle infotainment system and the external system. The gender of the text-to-speech voice of the external system may be determined. The gender of the text-to-speech voice of the vehicle infotainment system may be set based upon the gender of the text-to-speech voice of the external system.

In another implementation, a computing system includes a processor and memory is configured to perform operations including receiving a verbal command, from a user, on a vehicle infotainment system, wherein the vehicle infotainment system is configured to interface with an external system. A preferred system is identified for executing the verbal command. The verbal command is routed to the preferred system, wherein the preferred system is selected from the vehicle infotainment system and the external system.

One or more of the following features may be included. The external system may include one or more of: a cellular telephone; a smart phone; a tablet computing device; a portable computing device; and a handheld entertainment device. Identifying a preferred system for executing the verbal command may include identifying the preferred system based, at least in part, upon one or more of a defined system preference associated with the verbal command and a learned system preference associated with the verbal command. Identifying a preferred system for executing the verbal command may include identifying the preferred system based, at least in part, upon an embedded system preference included within the verbal command. Identifying a preferred system for executing the verbal command may include identifying the preferred system based, at least in part, upon the existence of an active session with one of the vehicle infotainment system and the external system. Identifying a preferred system for executing the verbal command may include: providing a verbal inquiry to the user; and identifying the preferred system based, at least in part, upon a verbal response received from the user concerning the verbal inquiry provided to the user. Identifying a preferred system for executing the verbal command may include: providing the verbal command to both the vehicle infotainment system and the external system; and determining the preferred system based, at least in part, upon a response received from one or more of the vehicle infotainment system and the external system. The gender of the text-to-speech voice of the external system may be determined. The gender of the text-to-speech voice of the vehicle infotainment system may be set based upon the gender of the text-to-speech voice of the external system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
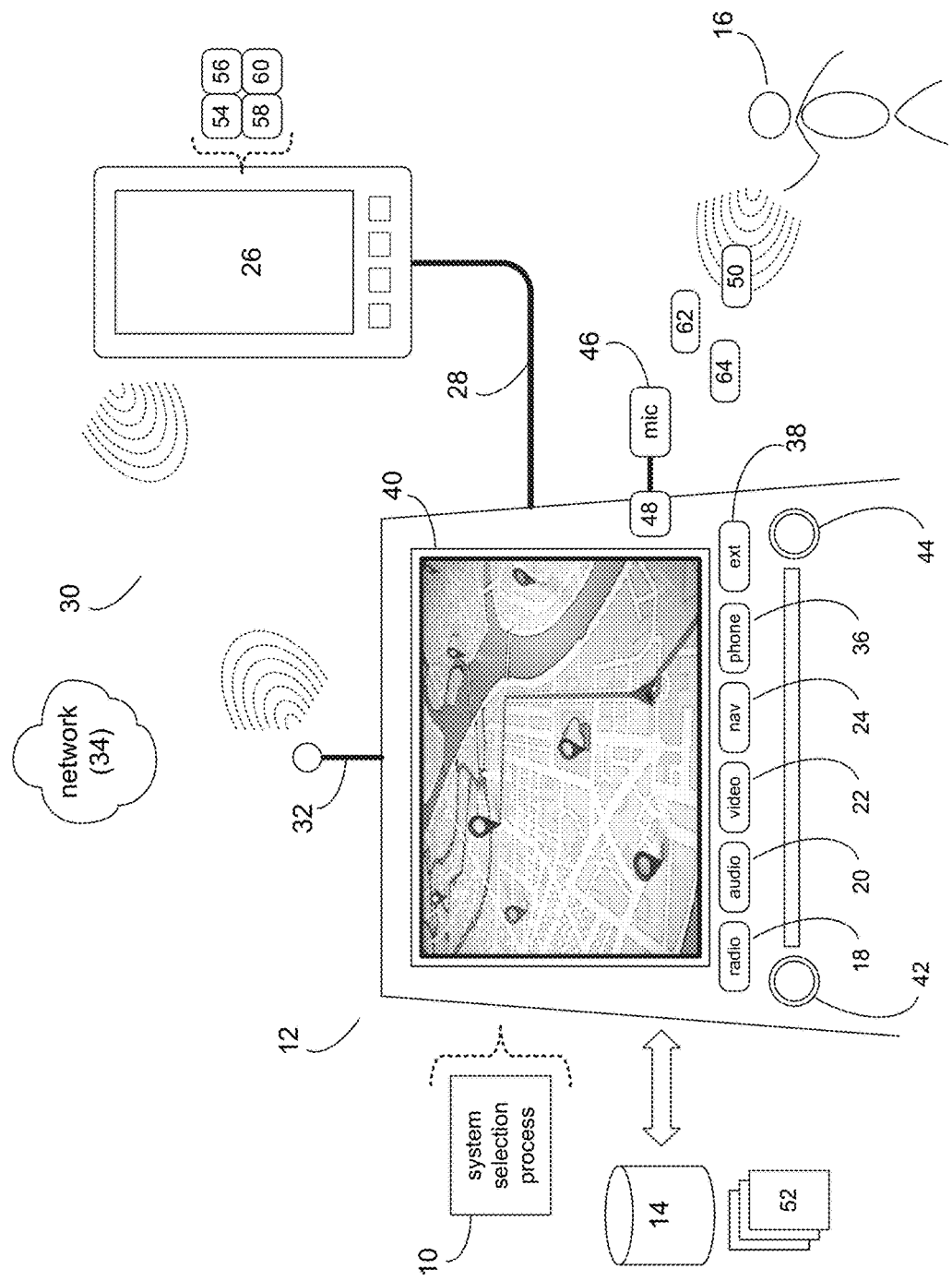
FIG. 1 is a diagrammatic view of an infotainment system that executes a system selection process according to an embodiment of the present disclosure.

In FIG. 1, there is shown system selection process 10. System selection process 10 may reside on and may be executed by vehicle infotainment system 12 (a computing device). Examples of vehicle infotainment system 12 may include any of the types of infotainment systems that are incorporated into vehicles, such as vehicle navigation systems, vehicle music systems, vehicle video systems, and vehicle climate control systems.

The instruction sets and subroutines of system selection process 10, which may be stored on storage device 14 coupled to vehicle infotainment system 12, may be executed by one or more processors (not shown) and one or more memory architectures (not shown) included within vehicle infotainment system 12. Examples of storage device 14 may include but are not limited to: a hard disk drive; a RAID device; a random access memory (RAM); a read-only memory (ROM); and all forms of flash memory storage devices. Vehicle infotainment system 12 may execute an operating system, examples of which may include but are not limited to Microsoft Windows™, Android™, iOS™, Linux™, or a custom operating system.

Vehicle infotainment system 12 may be configured to execute various different functionalities that may be of interest/useful to a user (e.g., user 16). Examples of such functionalities may include but are not limited to: radio functionality (e.g., that enables the playing of terrestrial radio stations and satellite radio stations); audio functionality (e.g., that enables the playing of audio, wherein this audio may be disc-based or locally stored on storage device 14); video functionality (e.g., that enables the playing of video, wherein this video may be disc-based or locally stored on storage device 14); and navigation functionality (e.g., that enables the execution of navigation/guidance functionality).

Vehicle infotainment system 12 may include a plurality of buttons (e.g., physical buttons or electronic buttons) that enable the selection of the above-described functionality. For example, the above-described radio functionality may be selectable via "radio" button 18; the above-described audio functionality may be selectable via "audio" button 20; the above-described video functionality may be selectable via "video" button 22; and the above-described navigation functionality may be selectable via "nav" button 24.

Vehicle infotainment system 12 may be configured to interface with one or more external systems (e.g., external system 26). Examples of external system 26 may include but are not limited to: a cellular telephone; a smart phone; a tablet computing device; a portable computing device; a remote computing device, a handheld entertainment device (e.g., such as a gaming device) or a cloud service/platform. When interfacing with vehicle infotainment system 12, external system 26 may be releasably coupled to vehicle infotainment system 12 via a hardwired connection (e.g., USB cable 28). Alternatively, external system 26 may be wirelessly coupled to vehicle infotainment system 12 via wireless communication channel 30 established between external system 26 and antenna 32 of vehicle infotainment system 12. An example of wireless communication channel 30 may include but is not limited to a Bluetooth communication channel. As is known in the art, Bluetooth is a telecommunications industry specification that allows e.g., mobile phones, computers, and personal digital assistants to be interconnected using a short-range wireless connection.

Vehicle infotainment system 12 and/or external system 26 may be configured to be wirelessly coupled to/access an external network (e.g., network 34). Examples of network 34 may include but are not limited to the internet, a cellular network, a WiFi network, and/or a cloud-based computing platform.

As discussed above, vehicle infotainment system 12 may be configured to execute various different functionalities that may be of interest/useful for a user (e.g., user 16). Some of these functionalities may be functionalities that are resident on (provided by) external system 26. Examples of such functionality may include phone functionality (e.g., that enables the placing of phone calls using external system 26 via vehicle infotainment system 12) and system access functional (e.g., that enables user 16 to access content or functionality of external system 26). Accordingly, the above-described phone functionality may be selectable via "phone" button 36 and the above-described system access functionality may be selectable via "ext" button 38. Vehicle infotainment system 12 may also include display screen 40 and one or more knobs/dials 42, 44 that effectuate the use of such functionalities.

Vehicle infotainment system 12 may include microphone assembly 46 and speech-to-text conversion system 48 (such as those available from Nuance Communications, Inc. of Burlington, Mass.). Accordingly, vehicle infotainment system 12 may be configured to accept verbal commands (e.g., verbal command 50) that are spoken and provided by (in this example) user 16. As will be discussed below in greater detail, these verbal commands (e.g., verbal command 50)

may be configured to allow user 16 to access and control the above-described functionalities in a hands-free fashion.

Unfortunately, since (in this example) vehicle infotainment system 12 and external system 26 may both be capable of providing functionalities to user 16 (oftentimes with these differing functionalities overlapping), confusion may occur when a verbal command (e.g., verbal command 50) is received for a functionality that may be provided & processed by either of vehicle infotainment system 12 and external system 26. For example, if a verbal command (e.g., verbal command 50) asks for driving directions, this navigation functionality may be provided by either the navigation system included within vehicle infotainment system 12 or by a navigation application (e.g., Waze™, Apple™ Maps, Google™ Maps) installed on external system 26. Accordingly, system selection process 10 may be configured to intercept these verbal commands (e.g., verbal command 50) so that they may be routed to the appropriate (or preferred) system.

Figure 2:
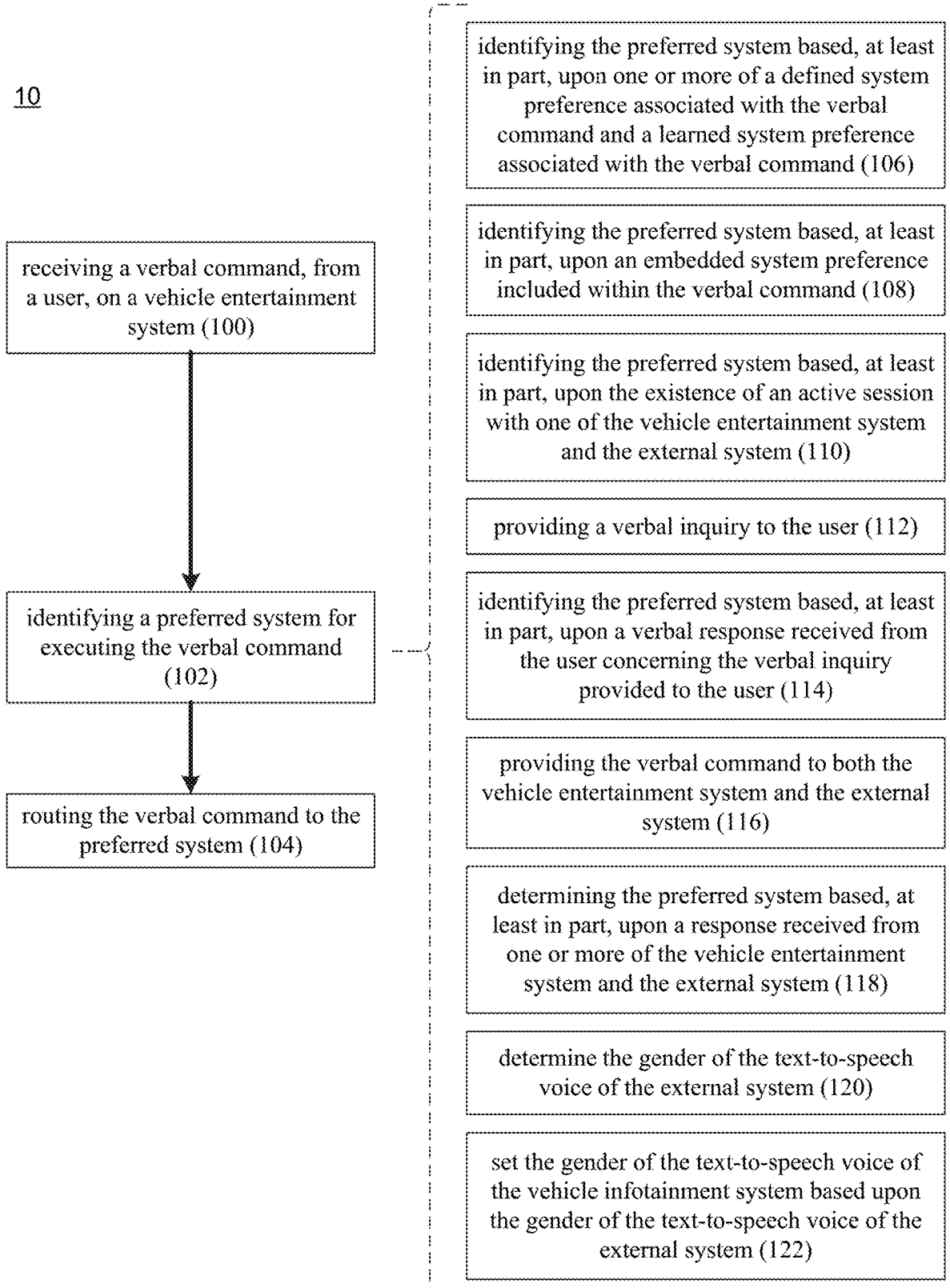
FIG. 2 is a flowchart of the system selection process of FIG. 1 according to an embodiment of the present disclosure.

Referring also to FIG. 2, assume for the following example that user 16 is driving and issues verbal command 50. For example, user 16 may select a voice command button (not shown) within the vehicle into which vehicle infotainment system 12 is installed, and then user 16 may speak verbal command 50. Alternatively, user 16 may say a wake up word/phrase (e.g., "Hey Siri" or "Hey Alexa") and then speak verbal command 50; or user 16 may simply speak verbal command 50 and system selection process 10 may interpret the request; or user 16 may respond to a prompt/request made by system selection process 10 by speaking verbal command 50. System selection process 10 may then receive 100 verbal command 50 (from user 16) on vehicle infotainment system 12.

Examples of verbal command 50 may include but are not limited to commands that concern: playing a terrestrial radio station, playing a satellite radio station, playing music within a music library, obtaining driving directions to a desired destination, placing a phone call to a spouse, locating a local gas station, identifying local places to eat, and receiving stock market quotes.

Upon receiving 100 verbal command 50, system selection process 10 may identify 102 a preferred system for executing verbal command 50, wherein this preferred system may be selected from e.g., vehicle infotainment system 12 and external system 26. Once the preferred system is identified 102, system selection process 10 may route 104 verbal command 50 to this preferred system.

Identifying the Preferred System:

The manner in which the preferred system is identified 102 by system selection process 10 may be accomplished using various methodologies. For example, some system preferences may be pre-defined, while other system preferences may be learned. Additionally, some verbal commands may be unknown to system selection process 10, thus requiring additional inquiry.

Defined Preference:

When identifying 102 a preferred system (chosen from vehicle infotainment system 12 and external system 26) for executing the verbal command (e.g., verbal command 50), system selection process 10 may identify 106 the preferred system based, at least in part, upon one or more of a defined system preference associated with the verbal command and a learned system preference associated with the verbal command.

In the configuration in which system selection process 10 identifies 106 the preferred system based, at least in part, upon a defined system preference associated with the verbal command, a lookup table (e.g., lookup table 52) may be utilized. For example, system selection process 10 may have access to lookup table 52, wherein lookup table 52 may associate various verbal commands with various functionalities of e.g., vehicle infotainment system 12 or external system 26. Lookup table 52 may be stored locally or remotely stored. For example, lookup table 52 may be stored locally within (or stored upon) storage device 14 that is coupled to vehicle infotainment system 12. Alternatively, lookup table 52 may be stored remotely within network 34. The associations defined within lookup table 52 may be defined by the user (e.g. user 16), may be defined by the maker of vehicle infotainment system 12, or may be designed by the manufacturer of the vehicle into which vehicle infotainment system 12 is installed.

For example, samples of the types of entries defined within lookup table 52 may include but are not limited to:

navigation verbal command→local functionality
terrestrial radio verbal command→local functionality
phone verbal command→remote functionality
satellite radio verbal command→remote functionality Accordingly and in a configuration that identifies 106 the preferred system based (at least in part) upon a defined system preference associated with the verbal command, if verbal command 50 requests driving directions to Yellowstone National Park, system selection process 10 may process lookup table 52 and route 104 verbal command 50 to the navigation functionality included within vehicle infotainment system 12 (i.e., the preferred system). Further, if verbal command 50 requests the playing of 96.5 FM (i.e., a terrestrial radio station), system selection process 10 may process lookup table 52 and route 104 verbal command 50 to the radio functionality included within vehicle infotainment system 12 (i.e., the preferred system). Conversely, if verbal command 50 requests the dialing of phone number 212-555-1212, system selection process 10 may process lookup table 52 and route 104 verbal command 50 to the phone functionality included within remote system 26 (i.e., the preferred system). Additionally, if verbal command 50 requests the playing of "Sirius™ Summer Jazz" (i.e., a satellite radio station), system selection process 10 may process lookup table 52 and route 104 verbal command 50 to the satellite radio functionality included within remote system 26 (i.e., the preferred system). The satellite radio functionality included within remote system 26 may be effectuated by remote system 26 via one or more applications (e.g., applications 54, 56, 58, 60) executed on remote system 26.

In the event that verbal command 50 is requesting a functionality that a) may be handled by either vehicle infotainment system 12 or external system 26, and b) lookup table 52 is silent concerning what the preferred system is for that particular type of functionality, a defined system-level default may be applied. For example, assume that verbal command 50 is "Play some 50s music" and lookup table 52 does not identify a preferred system for the requested audio functionality. Further, this requested audio functionality may be provided by vehicle infotainment system 12 via locally-stored music content available on vehicle infotainment system 12. Alternatively, this requested audio functionality may be provided by external system 26 via locally-stored music content available on remote system 26 or remotely-available music content accessible to remote system 26. Accordingly and in such a situation, a defined system-level default may be applied that e.g., routes such undefined functionality requests to the local system (e.g., vehicle infotainment system 12).

In the configuration in which system selection process 10 identifies 106 the preferred system based, at least in part, upon a learned system preference associated with the verbal command, system selection process 10 may determine the manner in which the functionality defined within the verbal command (e.g., verbal command 50) was processed in the past . . . and may use that processing history to decide how to process verbal command 50 now. For example, if verbal command 50 requests driving directions to Boston's Logan Airport and the most recent seven requests for navigation functionality were handled by the navigation functionality included within vehicle infotainment system 12, system selection process 10 may route 104 verbal command 50 to the navigation functionality included within vehicle infotainment system 12 (i.e., the preferred system).

When system selection process 10 identifies 106 the preferred system based, at least in part, upon a learned system preference, system selection process 10 may utilize some form of machine learning and/or artificial intelligence. For example, system selection process 10 may utilize probabilistic modeling to analyze functionality usage data within vehicle infotainment system 12 and external system 26 to uncover such learned preferences.

Embedded Preference:

When identifying 102 a preferred system (chosen from vehicle infotainment system 12 and external system 26) for executing the verbal command (e.g., verbal command 50), system selection process 10 may identify 108 the preferred system based, at least in part, upon an embedded system preference included within the verbal command.

For example, if verbal command 50 is "Play some Led Zeppelin on Apple Music", system selection process 10 may identify 110 the preferred system by processing and/or parsing verbal command 50 to determine if a portion of verbal command 50 indicates the specific functionality requested. Assuming that remote system 26 is an Apple™ product, remote system 26 may include an application (e.g., applications 54, 56, 58, 60) that enables the playing of Led Zeppelin via the "Apple Music" system. Accordingly and upon identifying 110 the "Apple Music" portion of verbal command 50, system selection process 10 may route 104 verbal command 50 to the audio functionality/Apple Music application within remote system 26 (i.e., the preferred system).

Active Session:

When identifying 102 a preferred system (chosen from vehicle infotainment system 12 and external system 26) for executing the verbal command (e.g., verbal command 50), system selection process 10 may identify 110 the preferred system based, at least in part, upon the existence of an active session with one of the vehicle infotainment system and the external system.

For example, assume that user 16 is driving in their car to Yellowstone National Park and they realize that they need gas. Accordingly, user 16 may issue verbal command 50 which states "Get me to the closest gas station". Accordingly, being that user 16 is currently using the navigation functionality of vehicle infotainment system 12, system selection process 10 may route 104 verbal command 50 to the navigation functionality within vehicle infotainment system 12 (i.e., the preferred system).

Request for Information:

When identifying 102 a preferred system (chosen from vehicle infotainment system 12 and external system 26) for executing the verbal command (e.g., verbal command 50), system selection process 10 may provide 112 a verbal inquiry to the user; and may identify 114 the preferred system based, at least in part, upon a verbal response received from the user concerning the verbal inquiry provided to the user.

As discussed above, there may be situations in which verbal command 50 is requesting a functionality that a) may be handled by either vehicle infotainment system 12 or external system 26, and b) lookup table 52 is silent concerning what the preferred system is for that particular type of functionality.

While (as discussed above), a defined system-level default may be applied, other configurations are possible. For example, assume again that verbal command 50 is "Play some 50s music" and lookup table 52 does not identify a preferred system for the requested audio functionality, wherein this requested audio functionality may be provided by vehicle infotainment system 12 via locally-stored music content available on vehicle infotainment system 12. Alternatively, this requested audio functionality may be provided by external system 26 via locally-stored music content available on remote system 26 or remotely-available music content accessible to remote system 26. Accordingly and in such a situation, system selection process 10 may provide 112 verbal inquiry 62 (e.g., "How would you like to play this 50s music? Locally? Remotely? Pandora?". User 16 may then provide verbal response 64 (e.g., "Locally") and system selection process 10 may identify 114 the preferred system (e.g., vehicle infotainment system 12) based, at least in part, upon verbal response 64 received from user 16 concerning verbal inquiry 62 provided to user 16.

Only One Choice:

When identifying 102 a preferred system (chosen from vehicle infotainment system 12 and external system 26) for executing the verbal command (e.g., verbal command 50), when only one system is available for (or capable of) providing the functionality requested in verbal command 50, system selection process 10 may select that available system.

For example, assume that vehicle infotainment system 12 does not include navigation functionality. Further assume that verbal command 50 requests driving directions to Disney World in Orland, Fla. Accordingly, system selection process 10 may route 104 verbal command 50 to the navigation functionality included within external system 26 (i.e., the preferred system), as vehicle infotainment system 12 does not include or offer such functionality.

First to Respond:

When identifying 102 a preferred system (chosen from vehicle infotainment system 12 and external system 26) for executing the verbal command (e.g., verbal command 50), system selection process 10 may provide 116 verbal command 50 to both vehicle infotainment system 12 and external system 26 and may determine 118 the preferred system based, at least in part, upon a response received from one or more of vehicle infotainment system 12 and external system 26.

As discussed above, there may be situations in which verbal command 50 is requesting a functionality that a) may be handled by either vehicle infotainment system 12 or external system 26, and b) lookup table 52 is silent concerning what the preferred system is for that particular type of functionality.

For example, assume again that verbal command 50 is "Play some 50s music" and lookup table 52 does not identify a preferred system for the requested audio functionality. Accordingly, system selection process 10 may provide 116 verbal command 50 to both vehicle infotainment system 12 and external system 26. System selection process 10 may then listen for a response from either vehicle infotainment system 12 and external system 26 and may determine 118 the preferred system based, at least in part, upon the response received.

For example, system selection process 10 may identify the preferred system as the first system to respond. Accordingly, if vehicle infotainment system 12 starts to play 50s music, system selection process 10 may e.g., cancel the request made of external system 26 or mute the audio of external system 26.

As another example, assume that verbal command 50 is "navigate to Ristorante Pablo". Accordingly, system selection process 10 may provide 116 verbal command 50 to both vehicle infotainment system 12 and external system 26. System selection process 10 may then listen for a response from either vehicle infotainment system 12 and external system 26. If vehicle infotainment system 12 responds with "Sorry, no matches found", that response may be suppressed by system selection process 10. Conversely, if external system 26 responds with "Here are your matches", system selection process 10 may determine 118 external system 26 to be the preferred system.

Voice Matching:

System selection process 10 may be configured to monitor the text-to-speech system included within external system 26 to determine 120 the gender of the text-to-speech voice of external system 26. System selection process 10 may then set 122 the gender of the text-to-speech voice of vehicle infotainment system 12 based upon the gender of the text-to-speech voice of external system 26. For example, vehicle infotainment system 12 may set the gender of the voice of vehicle infotainment system 12 to a) have the text-to-speech voice of vehicle infotainment system 12 match the text-to-speech voice of external system 26 (to provide a homogenous user experience); or b) have the text-to-speech voice of vehicle infotainment system 12 be the opposite of the text-to-speech voice of external system 26 (to provide for audible system differentiation).

Additionally, if there is more than one text-to-speech voice available on vehicle infotainment system 12 for a particular gender (e.g., there is a "Jennifer" text-to-speech voice and a "Sherry" text-to-speech voice), system selection process 10 may choose the text-to-speech voice (either "Jennifer" or "Sherry") that most closely matches the text-to-speech voice of external system 26. For example, if vehicle infotainment system 12 detects Siri's text-to-speech voice on external system 26, system selection process 10 may set the "Sherry" text-to-speech voice for vehicle infotainment system 12 because the "Sherry" text-to-speech voice sounds similar to Siri's text-to-speech voice.

Third Party System:

System selection process 10 may be configured to route verbal command 50 to third party systems. As discussed above, examples of network 34 may include but are not limited to, the internet, a cellular network, a WiFi network, and/or a cloud-based computing platform. Accordingly and upon receiving verbal command 50, system selection process 10 may be configured to route verbal command 50 to a third party system available via network 34, thus allowing user 16 to e.g., arm/disarm their home security system, open a garage door, unlock the front door of their home, or adjust the temperature of their apartment.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device, the computer-implemented method comprising:
   receiving a verbal command, from a user, on a vehicle infotainment system, wherein the vehicle infotainment system is configured to interface with an external system;
   wherein said verbal command is issued after a trigger phrase or word from the user;
   after having received the verbal command, identifying a preferred system for executing the verbal command that was received from the user;
   routing the verbal command to the preferred system;
   determining a gender of a text-to-speech voice of the external system; and
   setting a gender of a text-to-speech voice of the vehicle infotainment system based upon the gender of the text-to-speech voice of the external system,
   wherein the preferred system is selected from the group consisting of the external system and a subsystem of the vehicle infotainment system.

2. The computer-implemented method of claim 1, wherein the external system includes one or more of: a cellular telephone; a tablet computing device; a portable computing device; and a handheld entertainment device.

3. A manufacture comprising a non-transitory and tangible computer-readable medium having encoded thereon instructions for causing a vehicle infotainment system to carry a computer-implemented method that comprises:
   receiving a verbal command, from a user, wherein said vehicle infotainment system is configured to interface with an external system, wherein said verbal command is issued after a trigger phrase or word from the user;
   after having received the verbal command, identifying a preferred system for executing the verbal command that was received from the user:
   routing the verbal command to the preferred system;
   determining a gender of a text-to-speech voice of the external system, and
   setting a gender of a text-to-speech voice of the vehicle infotainment system based upon the gender of a text-to-speech voice of the external system,
   wherein the preferred system is selected from the group consisting of the external system and a subsystem of the vehicle infotainment system.

4. The manufacture of claim 3, wherein the external system includes one or more of: a tablet computing device; and a portable computing device.

5. An apparatus comprising a vehicle infotainment system that includes a processor and a memory, said vehicle infotainment system being configured to interface with an external device and to execute the steps of:
   receiving a first verbal command from a user following utterance of a trigger phrase or word by said user;
   identifying said external system as a preferred system for executing said first verbal command;
   routing said first verbal command to said external system, receiving a second verbal command from a user following utterance of a trigger phrase or word by said user;

identifying a subsystem of said infotainment system as a preferred system for executing said second verbal command;

routing said second verbal command to said subsystem of said infotainment system;

determining a gender of the text-to-speech voice of the external system; and setting a gender of the text-to-speech voice of the vehicle infotainment system based upon the gender of the text-to-speech voice of the external system.

6. The computing system of claim 5, wherein the external system includes one or more of: a tablet computing device; a portable computing device; and a handheld entertainment device.

7. The method of claim 1, wherein receiving the verbal command includes receiving a speech-signal representation of a command spoken by said user.

8. The method of claim 1, wherein identifying the preferred system comprises providing a verbal inquiry to the user and identifying the preferred system based at least in part upon a verbal response received from the user in response to the verbal inquiry.

9. The method of claim 1, wherein identifying the preferred system comprises providing the verbal command to both the vehicle infotainment system and the external system and determining the preferred system based at least in part on an audio response received by a system selected from the group consisting of the vehicle infotainment system and the external system.

10. The method of claim 1, further comprising providing the verbal command to both the vehicle infotainment system and the external system and identifying the preferred system based, at least in part, upon a response received from one or more of the vehicle infotainment system and the external system.

11. The method of claim 1, wherein identifying the preferred system comprises identifying the preferred system based at least in part on a system preference associated with the verbal command, wherein different verbal commands have different system preferences.

12. The method of claim 1, wherein identifying the preferred system comprises identifying the preferred system based at least in part on a learned system preference associated with the verbal command, wherein different verbal commands have different system preferences.

13. The method of claim 1, wherein identifying the preferred system comprises identifying the preferred system based at least in part on an embedded system preference included within the verbal command.

14. The method of claim 1, wherein identifying the preferred system comprises identifying the preferred system based at least in part upon the existence of an active session with the vehicle infotainment system.

15. The method of claim 1, wherein identifying the preferred system comprises identifying the preferred system based at least in part upon the existence of an active session with the external system.

16. The method of claim 1, wherein identifying the preferred system comprises identifying the preferred system based at least in part on a user's verbal response received to a verbal inquiry that has been provided to the user.

* * * * *